United States Patent Office 3,006,809
Patented Oct. 31, 1961

3,006,809
COCKROACH ATTRACTANT
Herman Gershon, North Bergen, N.J., assignor to Pfister Chemical Works, Inc., Ridgefield, N.J., a corporation of New Jersey
No Drawing. Filed Apr. 7, 1960, Ser. No. 20,520
5 Claims. (Cl. 167—48)

This invention relates to methods of attracting and exterminating insects and a chemical attractant useful therein. More particularly, it relates to an attractant for cockroaches useful with toxicants in the control of cockroach infestation.

Cockroaches present a severe infestation problem throughout the United States. They carry filth on their legs and bodies, and may spread disease by contaminating food. They damage fabrics, bookbindings, eat the glue in furniture and destroy food. Cockroaches have an offensive odor that may make food unpalatable if placed on dishes over which they have run. In addition to this, considerable distress and embarrassment may be caused occupants of buildings who discover cockroach infestation therein. As illustrative of the magnitude of this problem, over $6,000,000 was spent by the civilian population in the United States during 1955 for products to eliminate these insects.

One procedure for attempting to control cockroach infestation involves a saturation extermination technique in which sprays and dusts containing various toxicants are spread over an entire infested area. However, there are many dangers associated with widespread dispersal of toxicants. Most cockroach insecticides are poisonous to man and animal, and widespread spraying or dusting may contaminate food, dishes or utensils. Furthermore, many insecticide formulations contain inflammable components which impose severe hazards when spread extensively.

Many of the disadvantages of the saturation extermination technique can be eliminated or minimized by the use of insecticides containing appropriate attractants. Thus, by localizing the application of insecticides the dangers of toxicity, inflammability, or the like, may be reduced. Moreover, the use of attractants in insecticide compositions facilitates the use of less toxicant to produce comparable or improved results.

The term attractant is here employed to refer to some stimulus which causes an insect to perform directive locomotory responses toward the source of stimulation. Attractants may serve to lure insects away from the objects they damage and toward traps or toxicants, to sample local insect populations, to act as counter-agents in testing repellents or to offset the repellent properties of certain insecticides. In the past a number of attractants have been discovered, including acid hydrolyzed corn protein for the control of the Mediterranean fruit fly, geraniol for the Japanese beetle and methyl eugenol for the oriental fruit fly. However, no satisfactory attractant for the cockroach has hitherto been available.

It is an object of the present invention to provide methods of attracting and exterminating cockroaches and a chemical attractant useful therein.

A further object of the invention is the provision of such an attractant in cockroach insecticide compositions which are thus both attractive and toxic to cockroaches.

Still other and further objects will become apparent from the following detailed description of the invention.

According to this invention, a method of attracting cockroaches is provided comprising exposing an attractant composition in the vicinity of an area of cockroach infestation, the composition including, as a cockroach attractant, a hydrolyzate prepared from the feathers of domestic fowl.

The cockroach attractant of this invention may be utilized in a method for the extermination of cockroaches which involves exposing in the vicinity of an area of cockroach infestation, an insecticide composition containing the fowl feather hydrolyzate and sufficient toxicant to exterminate the cockroaches attracted thereto. Such insecticide composition, according to a further feature of this invention, has been found to retain the individual attractive and toxic effects of its components and, surprisingly, has actually been found to increase in attracance to cockroaches as a function of time.

The hydrolyzate of the invention may be prepared from the feathers of any domestic fowl, such as chickens, turkeys, ducks, geese, or the like. The fowl feathers are preferably first autoclaved and dried, as shown, for example, in United States Patent 2,702,245, and are thereafter refluxed in the presence of a hydrolyzing reactant, such as sulfuric or hydrochloric acid, to produce a solution of hydrolyzate, which is neutralized as with lime and separated from the insoluble residue as by filtration.

The hydrolyzate, after concentration to any desired degree, is mixed with any of the conventional cockroach toxicants. Satisfactory toxicants include, among others, sodium fluoride, malathion, chlordane and Diazinon (Geigy's trademark for O,O-diethyl-O[2-isopropyl-4-methylyl-pyrimidyl (6)] thiophosphate). These toxic ingredients may be admixed in amounts ranging from fractions of a percent by weight of the total solids to upwards of 50% thereof. The amount of toxicant employed is dependent, on the one hand, upon the strength of the toxicant, viz. the minimum amount required for effective control of the cockroach population to be exterminated, and, on the other hand, on economic considerations. Diazinon, for example, has been successfully utilized in concentrations of only 0.5% of the total solids content of the insecticide composition formulation.

The following examples illustrate specific embodiments of the attractants and insecticide compositions of this invention and illustrate the improved attractant effects thereof. It will be understood that the following are illustrative only, and not limiting of the scope of the invention.

*Example I.—Attractant preparation*

To 1,000 parts of 50% sulfuric acid was added 500 parts of autoclaved chicken feather meal (13.6% nitrogen content), autoclaved by the method disclosed in United States Patent 2,702,245. The mixture was refluxed for nine hours, diluted with an equal volume of water and brought to a pH of 8 with calcium hydroxide. The calcium sulfate formed by the reaction between the hydroxide thus added and the sulfuric acid was removed by filtration and the filtrate was concentrated by evaporation, thus leaving the concentrated feather hydrolyzate in the filtrate.

*Example II.—Attractant effect of feather hydrolyzate toward cockroaches*

The feather hydrolyzate prepared in Example I was mixed with water to produce a 50% aqueous solution thereof. Samples of the feather hydrolyzate solution were then compared with other protein hydrolyzates and standard laboratory food as attractants for cockroaches, as follows:

The hydrolyzate sample materials (identified below) were absorbed on pieces of cotton and the cotton samples were placed in one end of each of a number of 12 x 8 x 2 inch baking pans. A standard laboratory breeding food for raising cockroaches was placed at the opposite end of each pan with water between the cotton samples and the food. Six-ounce drinking cups with cutout openings to permit entrance by the cockroaches were then inverted over the samples and the food. Test groups of 20 roaches each were placed in several of the pans between the food and the hydrolyzate and daily counts were made of the roaches within the inverted cups. After each count, the roaches were dislodged from under the cups thus requiring a daily selection of preferred medium.

Below is a summary of the attractant properties of several hydrolyzates as compared with laboratory food. Each of the numbers equals the ratio of the number of roaches attracted to the sample material to the number of roaches attracted to the laboratory food:

| Sample Material | First Week | Third Week |
|---|---|---|
| Feather hydrolyzate | 10.2 | 99.0 |
| Hoof hydrolyzate | 8.1 | 0.3 |
| Corn protein hydrolyzate (Staley's Protein Insecticide Bait No. 2) | 3.2 | 0.0 |

It can be seen that the feather hydrolyzate attractant is more attractive to the cockroach initially than either hoof or corn protein hydrolyzate and also possesses the unique quality of increasing in attraction with time whereas the attraction of other hydrolyzates diminishes with time.

*Example III.—Insecticides containing feather hydrolyzate*

Samples of the feather hydrolyzate prepared in Example I were mixed with sodium fluoride and malathion to produce insecticide formulations containing 5% of each of the respective toxicants, and with chlordane to produce a formulation containing 3.8% of toxicant. The samples were then absorbed on cotton and toxicity of the insecticides in the presence of the attractants was determined by employing the procedure of Example II and determining percentages of dead cockroaches on subsequent days of a five-day test. The results were as follows:

| Sample Material | Days After Treatment | Percent Dead |
|---|---|---|
| Feather Hydrolyzate+5% sodium fluoride | 1 | 0 |
|  | 2 | 5 |
|  | 3 | 35 |
|  | 4 | 35 |
|  | 5 | 55 |
| Feather Hydrolyzate+5% malathion | 1 | 5 |
|  | 2 | 30 |
|  | 3 | 45 |
|  | 4 | 55 |
|  | 5 | 80 |
| Feather Hydrolyzate+3.8% chlordane | 1 | 0 |
|  | 2 | 10 |
|  | 3 | 55 |
|  | 4 | 80 |
|  | 5 | 95 |

The results indicate that the attractant and the various toxicants retain their respective attractive and toxic effects in the presence of one another during a protracted exposure to cockroach infestation.

*Example IV.—Comparison of insecticide compositions containing feather hydrolyzate attractant with other commercial cockroach insecticide compositions*

Samples of those insecticide compositions prepared in Example III containing 5% malathion and 3.8% chlordane were compared as to attractive and toxic effects with the following commercial insecticide compositions:

"Gator" roach hives—
  16.2% lead arsenate
  83.8% inert ingredients
"TAT" roach trap—
  1% thallium sulfate
  99% inert ingredients The comparison was made by the procedure of Example II on duplicate sets of twenty cockroaches each. The results were as follows:

| Days After Treatment | Percent of Original Number of Roaches Attracted to— | | Percent Dead |
|---|---|---|---|
|  | Feather Hydrolyzate +5% Malathion | Lab. Food |  |
| 1 | 97.5 | 0 | 2.5 |
| 2 | 77.5 | 2.5 | 20.0 |
| 3 | 47.5 | 10.0 | 42.5 |
| 4 | 17.5 | 20.0 | 62.5 |
| 5 | 5.0 | 17.5 | 77.5 |
| 6 | 0 | 15.0 | 85.0 |
| 7 | 5.0 | 10.0 | 85.0 |
|  | Feather Hydrolyzate +3.8% Chlordane | | |
| 1 | 95.0 | 5.0 | 0 |
| 2 | 62.5 | 10.0 | 27.5 |
| 3 | 22.5 | 7.5 | 70.0 |
| 4 | 5.0 | 2.5 | 92.5 |
| 5 | 2.5 | 0 | 97.5 |
| 6 | 0 | 0 | 100 |
| 7 | 0 | 0 | 100 |
|  | "Gator" Roach Hives | | |
| 1 | 0 | 100 | 0 |
| 2 | 0 | 100 | 0 |
| 3 | 0 | 100 | 0 |
| 4 | 0 | 100 | 0 |
| 5 | 0 | 100 | 0 |
| 6 | 0 | 95.0 | 5.0 |
| 7 | 0 | 92.5 | 7.5 |
|  | "TAT" Roach Trap | | |
| 1 | 90 | 10.0 | 0 |
| 2 | 90 | 10.0 | 0 |
| 3 | 90 | 5.0 | 5.0 |
| 4 | 70 | 15.0 | 15.0 |
| 5 | 70 | 15.0 | 15.0 |
| 6 | 70 | 15.0 | 15.0 |
| 7 | 70 | 5.0 | 20.0 |

Thus, it can be seen that a greater degree of control over cockroaches can be attained by the use of insecticide compositions containing a feather hydrolyzate attractant than by means of some typical commercially available roach insecticide compositions.

The present invention accordingly provides a method of attracting and exterminating cockroaches, and an insecticidal composition embodying a novel feather hydrolyzate attractant which exhibits high attractive effects toward roaches and, surprisingly, exhibits augmented attraction as a function of time.

Since different embodiments of the invention may be made without departing from the scope thereof, it is intended that all matter contained in the above description or shown in the accompanying drawing shall be interpreted as illustrative and not in a limiting sense.

What is claimed is:
1. A method of attracting cockroaches comprising exposing an attractant composition in the vicinity of an area of cockroach infestation, said composition containing a feather hydrolyzate prepared by heating moist feathers of fowl under superatmospheric pressure, drying the heated feathers to produce a feather meal, reacting said meal in admixture with water and a mineral acid selected from the group consisting of sulfuric and hydrochloric acids to produce an acid hydrolyzed product, neutralizing said acid hydrolyzed product and separating the feather hydrolyzate from said product, as a cockroach attractant therein.

2. A method for the extermination of cockroaches comprising exposing an insecticide composition in the vicinity of an area of cockroach infestation, said composition containing a feather hydrolyzate prepared by heating moist feathers of fowl under superatmospheric pressure, drying the heated feathers to produce a feather meal, reacting said meal in admixture with water and a mineral acid selected from the group consisting of sulfuric and hydrochloric acids to produce an acid hydrolyzed product, neutralizing said acid hydrolyzed product and separating the feather hydrolyzate from said product, in combination with sufficient toxicant to exterminate the cockroaches attracted to said composition.

3. The method as defined in claim 2 wherein said toxicant is selected from the group consisting of sodium fluoride, malathion, chlordane and O,O-diethyl-O[2-isopropyl-4-methyl-pyrimidyl (6)] thiophosphate.

4. An insecticide composition for the extermination of cockroaches comprising feather hydrolyzate prepared by heating moist feathers of fowl under superatmospheric pressure, drying the heated feathers to produce a feather meal, reacting said meal in admixture with water and a mineral acid selected from the group consisting of sulfuric and hydrochloric acids to produce an acid hydrolyzed product, neutralizing said acid hydrolyzed product and separating the feather hydrolyzate from said product, admixed with a sufficient amount of a toxicant, to exterminate the cockroaches attracted to said composition.

5. The composition of claim 4 wherein said toxicant is selected from the group consisting of sodium fluoride, malathion, chlordane and O,O-diethyl-O[2-isopropyl-4-methylpyrimidyl (6)] thiophosphate.

References Cited in the file of this patent
UNITED STATES PATENTS

| | | |
|---|---|---|
| 434,243 | Carlile et al. | Aug. 12, 1890 |
| 2,702,245 | Mayer et al. | Feb. 15, 1955 |

OTHER REFERENCES

Steiner, J. Econ. Entomology, 45:5, pp. 838–843, October 1952.

Hanna: Handbook of Agricultural Chemicals, 2nd Ed., 1958, p. 272, "Chlordane"; pp. 282–3, "Diazinon"; pp. 301–2 "Malathion"; and pp. 328–9 sodium fluoride.